INVENTORS.
P.P. KORN
L. KORN

ATTORNEY

United States Patent Office 3,400,519
Patented Sept. 10, 1968

3,400,519
HIGH EFFICIENCY AIR FILTER
Paul P. Korn, 12 N. Lake Circle, and Lawrence Korn, 6 Pine Brook Drive, both of White Plains, N.Y. 10605
Filed Jan. 11, 1967, Ser. No. 608,679
6 Claims. (Cl. 55—484)

ABSTRACT OF THE DISCLOSURE

A multi-pocket air filter comprising one or more bags of filter media mounted on a header member through which the air enters each bag. A shorter porous separator sheet is provided between longer media bag sides which are joined together along substantially parallel spaced lines to form under air pressure plural tubular members divided by the separator and constituting air channels for the air stream. The filter supported only at the header remains collapsed until inflated by air pressure.

---

Figure 1:
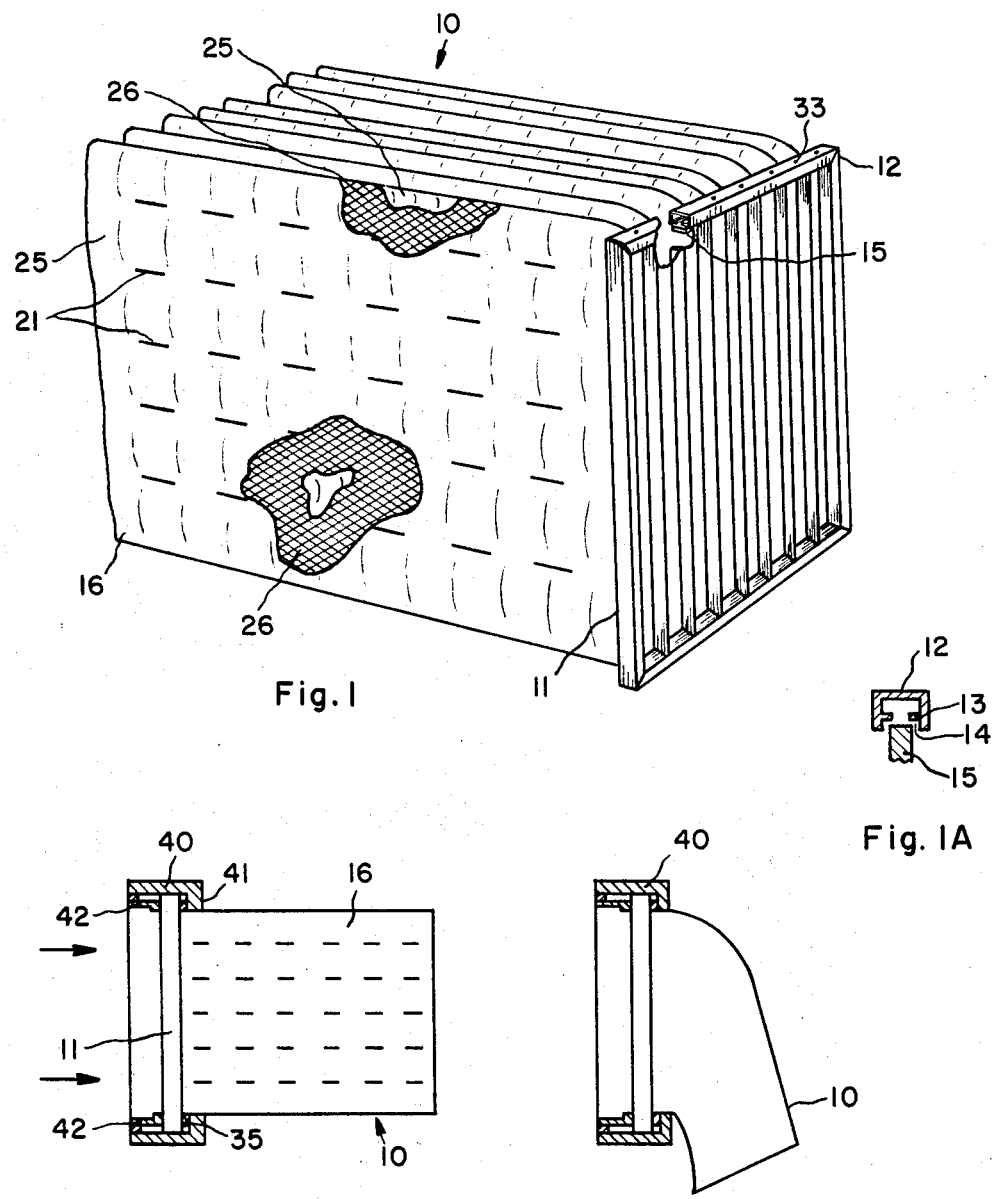

This invention relates to high efficiency, replaceable air filters of extended surface area for air cleaning and purification.

Many of the modern high-capacity dry air filters are of the so-called pleated type, which in operating condition are arranged to form a series of pleats or folds forming V-shaped channels for passage of the air stream. The filter medium is mounted on a frame in turn supported on a holder installed as a permanent part of the air conditioning system. To ensure the proper arrangement of the medium pleats, it is conventional to provide permanently within the holder a wire grid or frame adapted to receive and support the replaceable filter medium in the desired zig-zag configuration. Other known arrangements provide for the supporting wire frame to be arranged as part of the filter frame, to be replaced together as a unit with the filter medium. Such pleated filters require means in the holder for cooperating with mating means on the frame for sealing the edges against leakage of air around rather than through the filter medium.

A recent development eliminates the channel defining wire supports by supporting the filter only at the air intake end on a front frame member or header, and arranging the filter medium to form a series of closed pockets, open only at the intake end, thus requiring only a single annular seal at the header periphery to prevent leakage or air bypass. In the absence of air pressure, the pockets remain collapsed and the whole filter is suspended from the header. When air pressure is established, the pockets expand stretching the filter medium and extending it horizontally to receive the air flow.

The prior art arrangements define the pocket shape in two different ways. The simpler arrangement wraps the filter medium in elongated sheets around projections from the frame header plate, which projections surround openings in the header. Parallel air channels are formed by stapling or sewing together the medium between the projections. This filter has proven unsatisfactory in several respects. First, the surface area of filter medium present is relatively low. Increasing the surface area is desirable because increased surface area means reduced air resistance and thus a smaller pressure drop across the filter, and increased lifetime due to a larger dirt holding capacity. Another drawback of this filter is that the air channels formed in the pocket are constricted at the rear. As a result, most of the dirt collection on the filter medium is near the intake end, which sharply reduces lifetime.

The other prior art arrangement is more complicated in construction, more expensive to fabricate, and requires special machinery. The pockets are formed by a special sewing technique which loosely stitches together the filter medium at the intake end but tightens up the stitching along the length of the medium forming elongated tapered pockets with generally rectangular decreasing cross-sections. In addition to being more expensive, this filter still does not maximize the surface area of filter medium made available.

The principal object of our invention is a novel air filter of the self-supporting, multiple-pocket, high-efficiency type as described which is simple and inexpensive to fabricate, and which provides, for a given size of filter, an increased surface area of the filter medium affording reduced air resistance and increased lifetime.

This and other objects of our invention as will appear hereinafter are obtained by increasing the height of the filter medium prior to assembly into each pocket, and disposing between each pair of adjacent sheets of the filter medium a porous flat separator of smaller height. The sandwich of filter media with the center separator are then joined together along their length at spaced intervals across their height to form plural air channels. Due to the larger height of the filter media, compared with the separator, the media form loose sections on opposite sides of the separator when the latter is held taut. The top, bottom and rear edges of the sheets are then closed off, and plural such assemblies mounted on the frame header plate with the open pocket ends facing the air intake. When air pressure is established, the pockets inflate or balloon outward, forming in each pocket elongated air channels of generally uniform oval cross-section around the center separator. We have found that such a construction causes the filter medium to be arranged very uniformly and homogeneously in the air stream with all of the medium participating in the air cleansing operation, due to the presence of the flat separator which ensures the inflation or ballooning of the pocket along its entire length, affording increased lifetime before replacement becomes necessary. Moreover, the separators to which the media pair are attached assist in preventing the pocket sides from contacting the sides of adjacent pockets, which would tend to block the air passage and reduce the effectiveness of those pockets in the air cleansing operation. In addition, we have found that, for a given size of frame and given length of the filter, and for the same number of pockets, we can provide at least 20% more filter medium, reducing the pressure drop across the filter and further increasing the usable lifetime. Moreover, the provision of the flat separator sheet is responsible for a negligible increase in the cost of the filter, whereas our novel construction enabling the use of stapling, for example, as the joining technique offers a considerable reduction in fabrication expense.

Figure 2:
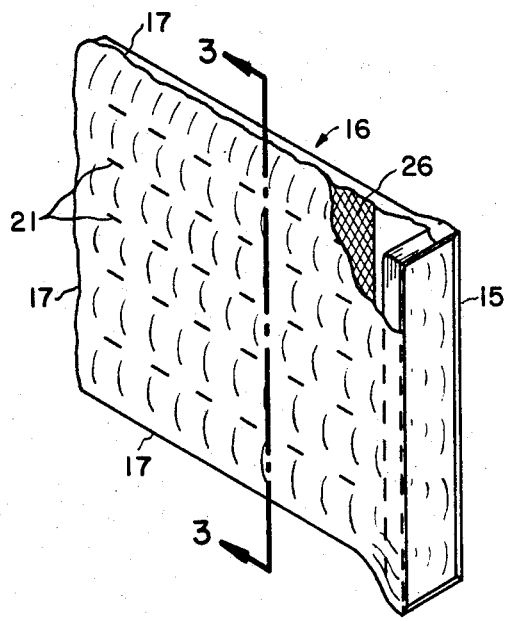
Figure 3:
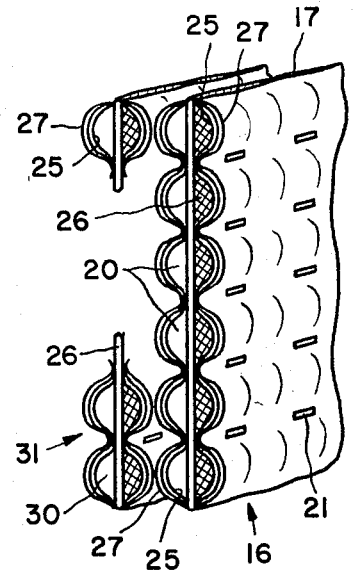
Figure 6:
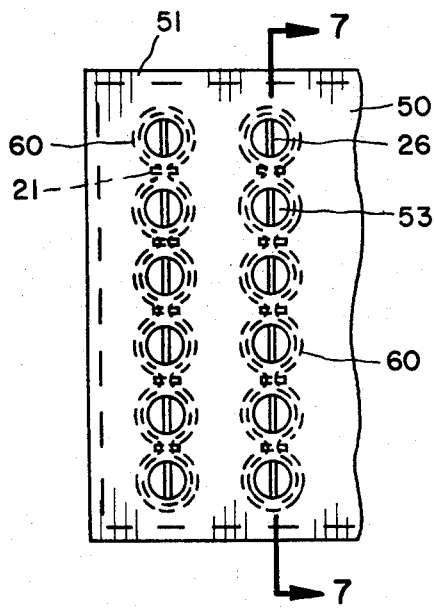
Figure 7:
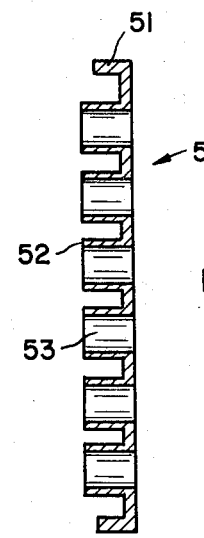

The invention will now be described with reference to the accompanying drawing, wherein: FIG. 1 is a perspective view of one form of our novel air filter with the filter bags or pockets positioned vertically for illustrative purposes; FIG. 1A is an enlarged detail view of the frame channel; FIG. 2 is a perspective view of one of the vertical pockets of the filter shown in FIG. 1; FIG. 3 is a schematic view illustrating the inflation of the pockets of the filter of FIG. 1 under air pressure; FIGS. 4 and 5 are side views showing the installed filter of FIG. 1 in inflated and collapsed positions, respectively; FIG. 6 is a front view of part of my novel filter on a different type of header; FIG. 7 is a cross-sectional view of the header of FIG. 6.

FIG. 1 is a perspective view illustrating one form of a filter 10 in accordance with the invention. The filter comprises a front frame member or header 11 which supports the entire filter cartridge. The filter shown in FIG. 1 constitutes an integral unit which is installed in the holder on the premises involved and, when it reaches the end of its lifetime, determined by the pressure drop across it, it is taken out, disposed of, and replaced by a new filter. The header 11 comprises a rectangular frame 12 which may be for example, of plastic or metal. The frame 12 has a hollow core with a cross-piece 13 forming a channel 14 for receiving a plurality of rectangular supports 15 (FIG. 1A) to which the filter media is secured.

As will be observed from FIG. 2, the support 15 comprises a rectangular strip, e. g. of metal, on the outer surface of which is secured, as by gluing for example, a flexible bag 16 whose top, bottom and read edges are joined together, as by seaming 17 the edges by sewing for example. The single open vertical bag or pocket that is thus formed is divided into six horizontal air channels 20 by joining the sides of the bag along its length direction, away from the support 15, at spaced intervals along its height, the vertical direction of FIG. 2. FIG. 2 illustrates one inexpensive way of forming the air channels, which we prefer, using a series of staples 21, of metal for example. As shown in the illustrative example, five horizontal rows of six staples each are provided to define six horizontally-extending air channels arranged vertically one above the other. Sewing or other joining means can also be employed. The bag material itself is formed of three essential elements, though we prefer to add two more elements for reinforcing purposes. The three essential elements include two extended sheets of flexible filter media 25 sandwiching between them a porous flexible flat separator 26. The filter media 25 may be of any conventional material, such as, for example, fiberglass of the high efficiency type, cellulose asbestos paper, or the like. The separator 26 may be of any flat porous material, such as cloth or paper. We prefer to use a nylon netting. The additional two elements provided are porous flexible backing sheets 27, e.g. of cloth, paper, glass or synthetic material—we have used nylon—disposed on the outside of the filter media 25 to assist in supporting them.

In accordance with our invention, the filter media 25 have a height at least 10% greater than the height (the vertical dimension in FIG. 2) of the separator 26 when arranged in a flat plane. Preferably the media 25 height (when laid flat) is approximately 20% greater than the separator 26 height (when laid flat). As an example only, for an 8-pocket filter cartridge 10 having a height of 24", a width of 24", and a length of 36", with each support 15 having a width of about 2.5", the separator 26 height is approximately 24", and the filter media 25 height (laid flat) is approximately 30". The media backing sheets 27 are usually slightly higher than the filter media 25 as they surround the outside. One way of making the bag is by feeding the media and backing sheets one on top of another, with the separator 26 centered in between, over a suitable mandrel or other shaping device which bows the excess filter media and backing material so their height dimension (their length dimensions are alike) is reduced approximately 20% to that of the shorter center separator, which is maintained flat, forming six oval-shaped air channels around the separator and then, while it is held in this preformed position, stapling 21 together the bag sides in the pattern illustrated in FIG. 2. Thus, each pocket comprises longer media sides stapled to a shorter separator portion forming the plural oval-shaped air channels. Then, the stapled bag is removed from the mandrel, cut to size, and the top, bottom and rear edges 17 seamed together, e.g. by sewing, gluing, or heat-sealing. Lastly, several inches of the separator at the front of the pocket is cut off to allow room for expanding the opening to fit the support 15. If desired, additional netting may be attached to the inside surfaces of both filter media where the separator was removed, to reinforce the media where joined to the header and prevent erosion.

When air pressure is established across the pockets, the latter inflate as illustrated in FIG. 3 (the sheet thicknesses are enlarged for the sake of clarity) forming plural generally oval-shaped media sides around the center separator. What the center separator 26 does is to assist in forming oval air channels of generally uniform cross-section along their length so that the air stream is distributed homogeneously over the whole filter media. Moreover, extending down the length of the channels, the separator 26 ensures that the whole pocket remains inflated during operation preventing dirt accumulation only at the intake end. In addition, the separators function to help keep the bags 16 extended out in straight lines to maintain the filter media uniformly distributed over the whole air stream. Still further, since the separators 26 force the media 25 to form oval or curved sides, the contact between the bag sides of adjacent columns is limited to only a few points or small areas, as is illustrated in FIG. 3 which also shows several channels 30 in the adjacent bag 31 or pocket. Without the separators 26 present, and with the same large amount of filter media present, the inflating action would tend to press the sides of adjacent pockets together increasing the resistance to air flow and reducing the participation of those pocket sections in the air cleaning operation.

The element illustrated in FIG. 2 is completed by simply attaching the open end of the bag 16 e.g. by gluing, to the outside of the support 15. A number of such bags or pockets are now assembled in the frame 12 of FIG. 1. They are placed side by side with the short side of each support 15 seated in the channel 14 and secured therein, as by gluing or riveting 33, for example (FIG. 1A). The adjacent long sides of the supports 15, which abut one another, may also be secured together in any convenient manner, such as by providing an additional metal strip which fits over the adjacent sides and is glued in place.

For installation, the filter is mounted in a suitable holder installed usually as part of a bank on the premises where the air is to be filtered. A typical holder 40 is illustrated in FIG. 4. It comprises simply a hollow rectangular frame with a shoulder 41 against which the header 11 is butted with a gasket 35 provided on the inside of the shoulder 41 butting the header periphery and preventing air by-pass. Clamps 42 are then provided to lock the header 11 in position and seal it tightly into the frame. In operation, air pressure inflates the pockets extending the bags horizontally downstream. When the fan is shut down, the bags collapse as illustrated in FIG. 5; thus any accumulated dirt tends to fall to the bottom or rear end of the bags, making removal of a dirty filter less messy by preventing the dirt from falling out. In addition, any accumulated dirt cakes in the filters remaining tend to get broken up, and when the fans are restarted the broken filter cakes are carried to the back of the pockets. This extends the life expectancy. The mounting of the filter bags only on the front header, thus eliminating supporting wire grids, enables the bags to be folded resulting in a smaller shipping package, and also reduces storage space and the service area required for the filter bank.

FIGS. 6 and 7 illustrate a modified form of header, the filter bags or pockets 16 with the incorporated separator being otherwise the same. As shown, it comprises a flat plate 50, e.g. of plastic or metal, with a raised peripheral edge 51 and provided with rearwardly extending projections or embossments 52 each surrounding an opening 53 in the plate. The seamed and stapled bags 16, shown in dashed lines at 60, are now joined to the header 50 so as to extend around the embossments 52 and are adhered thereto, as by gluing or heat-sealing.

As will be seen from the foregoing, by providing a porous flat separator between oversized filtering media, the pockets under air pressure are compelled to assume a desirable oval shape, which distributes the filtering media uniformly over the air stream and enables more media material to be incorporated in a given size of filter cartridge thus increasing the dirt capacity and life expectancy, and reducing the pressure drop across the filter. These significant improvements over the prior art are obtained at a relatively small additional expense, while permitting the use of simple and inexpensive fabrication techniques.

While we have described our invention in connection with specific embodiments and applications, other modifications thereof will be readily apparent to those skilled in the art without departing from the spirit and scope of the invention as defined in the appended claims.

What is claimed is:

1. A high-efficiency air filter comprising a header frame member having opening means constituting the air inlet of said filter, and at least one filter bag having closed side edges, a closed downstream end and an open upstream end forming a mouth for receiving the air to be filtered, said filter bag being mounted only at its upstream end on the header around the opening means thereat with its open mouth arranged at the air inlet opening of said header, said filter bag comprising opposed layers of flexible air-cleaning filter media joined at their sides and downstream edges and a flexible flat separator element extending between the filter media layers over substantially the distance between the closed side edges and between the downstream and upstream ends, said flexible separator element comprising a flat sheet of porous material extending generally parallel to the opposed media layers, and means joining and bringing into abutting relationship the opposed layers of filter media and the separator sheet disposed between them in the direction of the air flow along spaced substantially parallel lines parallel to the side edges with the separator element being spaced from the media layers except at the side edges and the abutting means under air pressure to subdivide the bag into plural tubular members of filter media material all extending in the direction of the air flow to form plural air channels therefor, the separator sheet element dividing the tubular members into tubular portions on opposite sides thereof, the linear dimension of each media portion defining a tubular portion, measured along a cross-sectional plane through the bag and perpendicular to the air flow, exceeding the linear dimension of the separator element measured along the same plane, such that generally oval-shaped air channels are formed when air enters the bag at the upstream end through the header opening and exits from the bag at the downstream end after passing through the filter media.

2. A high-efficiency air filter as set forth in claim 1 wherein the means bringing into abutting relationship comprises plural rows of spaced staples stapling together the filter media and separator.

3. A high-efficiency air filter as set forth in claim 1 wherein the separator element is a flat resin sheet of open netting.

4. A high-efficiency air filter as set forth in claim 1 wherein the header member comprises an open rectangular frame and plural open rectangular supports mounted in a row on the rectangular frame, and plural collapsible filter bags are mounted adjacent one another each on one of said rectangular supports.

5. A high-efficiency air filter as set forth in claim 1 wherein the header member comprises a flat plate with rearwardly projecting embossments arranged in adjacent columns, and plural collapsible bags are mounted adjacent one another on the header each surrounding at its open end a column of embossments.

6. A high-efficiency air filter as set forth in claim 1 and including plural vertically-extending filter bags mounted parallel and adjacent one another on the header, each of said bags comprising media portions whose linear dimension in the said cross-sectional plane exceeds that of the separator element by approximately 20%.

References Cited

UNITED STATES PATENTS

| | | | |
|---|---|---|---|
| 1,012,122 | 12/1911 | Budil | 55—341 |
| 1,049,789 | 1/1913 | Williamson | 55—484 |
| 3,124,441 | 3/1964 | Rivers | 55—500 |
| 3,160,908 | 12/1964 | Peabody et al. | 55—304 |
| 3,173,777 | 3/1965 | Tamny | 55—484 |
| 3,190,059 | 4/1965 | Bauder et al. | 55—499 |
| 3,208,205 | 9/1965 | Harms et al. | 55—487 |
| 3,276,190 | 10/1966 | Babbitt et al. | 55—341 |

FOREIGN PATENTS 1,363,326 5/1964 France.

HARRY B. THORNTON, *Primary Examiner.*

B. NOZICK, *Assistant Examiner.*